(No Model.)
A. B. TRENNER.
SAFETY STOP FOR CARS.
No. 512,341. Patented Jan. 9, 1894.
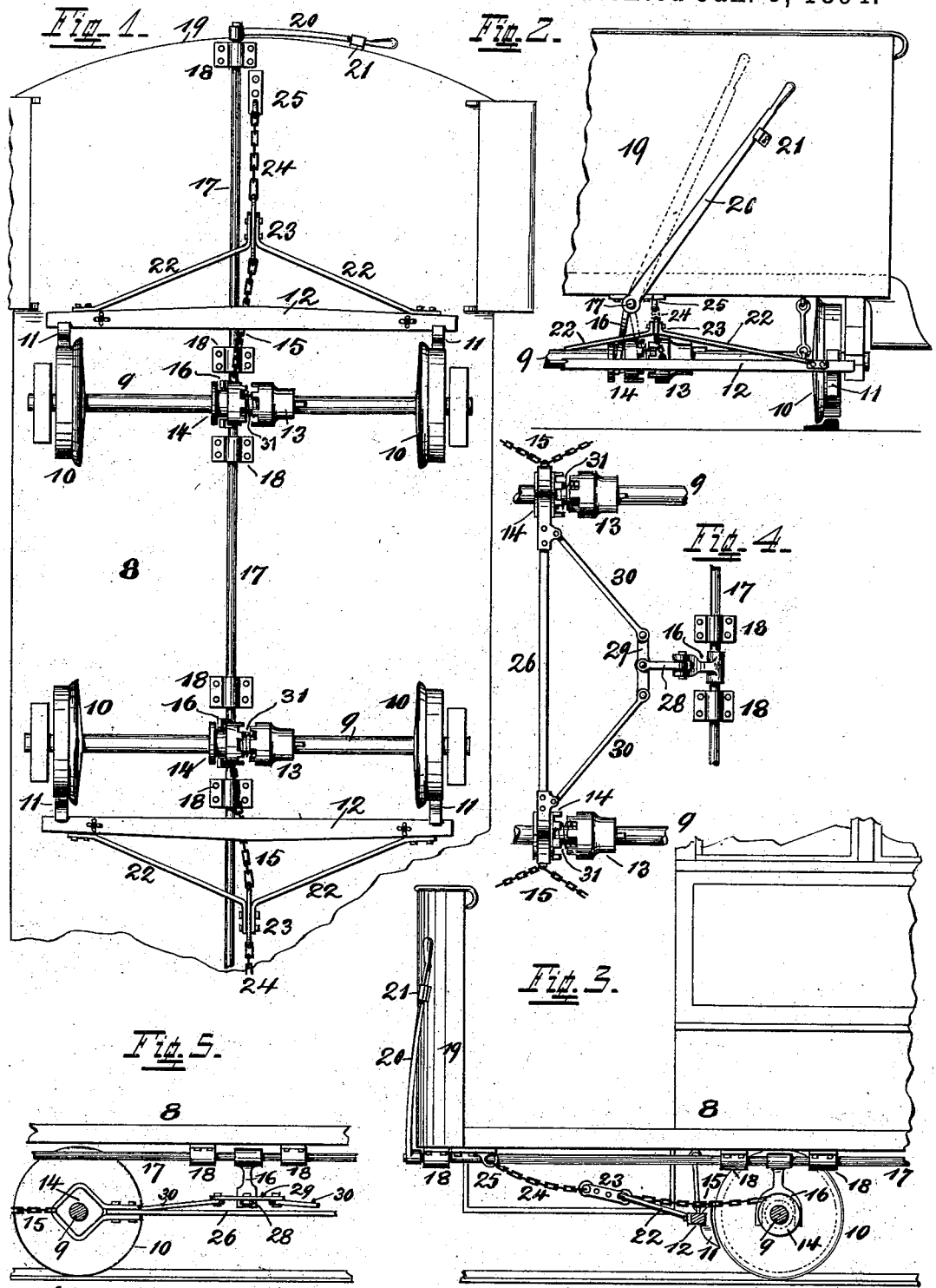
Attest
J. E. Hill
Wm. Krane
Inventor
Alfred B. Trenner
by C. Spengel Atty.

UNITED STATES PATENT OFFICE.

ALFRED B. TRENNER, OF CINCINNATI, OHIO.

SAFETY-STOP FOR CARS.

SPECIFICATION forming part of Letters Patent No. 512,341, dated January 9, 1894.

Application filed October 30, 1893. Serial No. 489,457. (No model.)

*To all whom it may concern:*

Be it known that I, ALFRED B. TRENNER, a citizen of the United States, and a resident of Cincinnati, Hamilton county, State of Ohio, have invented a certain new and useful Positive Safety-Stop for Cars; and I do declare the following to be a full, clear, and exact description of the invention, such as will enable others skilled in the art to which it appertains to make and use the same, attention being called to the accompanying drawings, with the reference-numerals marked thereon, which form a part of this specification.

This invention relates to safety appliances for cars, particularly electric-cars, for the purpose of bringing them to a quick stop to prevent accidents. It is principally intended for use when a car has become unmanageable, for instance when going down-hill and where the ordinary brakes are not sufficient, or refuse to work, never taking the place of the latter however during the regular operation of the car. The leading difference in the action of my device over the usual brakes is that it stops positively the further rotation of the wheels, being in this respect unlike the former, which depend on frictional contact which permits the wheels for a considerable time and at a decreasing speed to rotate yet before the final stop occurs.

I am aware that the stopping of the rotation of the wheels in this manner does not at once bring the car to a stop, but the intense friction generated between the sliding wheels and the rails accelerates such event and causes it to occur in a much shorter time than would be the case otherwise with the ordinary brakes. These latter by excessive speed, such as is often attained by "runaway" cars, usually refuse to accomplish the desired end altogether, owing to the insufficiency of a frictional contact merely and it is only by a positively acting stop-mechanism that the required effect is obtained.

To this end I have devised a mechanism which forms the subject of my invention and is described and pointed out in the following specification and claims, together with its operation, parts, and construction, the latter being also illustrated in the accompanying drawings, in which—

Figure 1, is an under side and Fig. 2, a partial front-view of a car embodying my invention. Fig. 3, is a partial sectional side-elevation of one end of a car. Figs. 4, and 5, show in views similar to Fig. 1, and 3, respectively, a modified construction of the device.

8, is the car floor. 9 are the axles, and 10 are the wheels.

11 are the brake-shoes, and 12 the beams supporting them, of an ordinary brake mechanism.

One or preferably the two axles carry each one half of a customary clutch 13, rigidly and immovably affixed thereto and rotating with them. The other half 14, of each clutch is movably secured to the same axle, the faces of each opposite each other.

The movable half of each clutch is secured by means of a suitable link or chain 15, to a fixed point on the car-mechanism, or car-frame so that before as well as after engagement with the fixed half of the clutch, it is incapable of rotating. When so engaged it stops of course this other half and with it the rotation of the axle, which carries the wheels.

It is my object in cases of extreme danger when the ordinary brake 11, 12, is useless or insufficient by not acting quick enough,—as for instance when a car becomes unmanageable while going down a steep hill, or has left the track and approaches the edge of an embankment, or when an obstruction suddenly appears in front,—to bring this movable half of the clutch in engagement with the fixed half, whereby the rotation of the wheels is at once stopped and the speed slackened by the excessive friction which the sliding wheels create.

I am fully aware that such abrupt stoppage of the wheels will cause a sudden shock to the passengers and to the car and its mechanism, but it must be remembered that the calling into action of this device is to be used only as a last resort when everything else fails and where the lesser inconvenience is preferable to a certain greater and otherwise inevitable disaster.

The location of the clutch-halves on the axles, as well as the mechanism for bringing them into operative engagement, might be arranged in various ways to suit the particular style of the car.

I prefer to use a forked lever 16, which engages with the sliding clutch-half and depends from a rock-shaft 17, working in bearings 18, secured to the under side of the car. It runs to the end of the latter and stops even with the dash-board 19, where an operating lever 20, is secured to it which when lifted, brings the two clutch-halves in engagement as may be readily understood. When rock-shaft 17 is run through the entire length of the car and provided at each end with an operating lever 20, the safety-stop may be worked from either end and is accessible to the motor-man as well as to the conductor. The location of said lever determines of course the length of shaft 17 and is in turn determined by the particular style of the car-body. I prefer however in consideration of its limited use, to have this lever located as shown, in front and to the outside of the dash-board, where it rests normally on a stop 21, and is out of the way during the ordinary operation of the car. It will be noticed that chain 15, is secured to two stiff rods 22, where they join together at 23, the other ends of these rods being connected to the brake-beam. The effect of this construction is also a simultaneous operation of the ordinary brake-mechanism which thereby assists the action of the clutch and by the frictional contact of the brake-shoes against the wheels, slightly preceding the final stoppage of the latter, softens somewhat the shock when this last event takes place. It is not my intention however to rely solely on this connection of chain 15, at 23 and the same is carried further by an additional length 24, which at 25, is securely fastened to the car-frame so that in case the brake-beam or rods 22, slightly yield, the tension is at once transferred onto chain 24, and its fixed connection, whereby when the former parts give way, the clutch and axle are still kept from rotation. Chain 24, is only sufficiently slack to permit the normal operation of the brake-beams and it becomes nearly taut when the brake-shoes are in contact so that in case a giving way of the brake beams occurs, as above mentioned, the strain is at once and unnoticeably transferred to this second chain.

In the modification illustrated by Figs. 4 and 5, two chains 15, are used which are directly secured to the brake-beams and the clutches are connected by a strap 26, which takes the place of chain 24 and whereby the clutch on one axle pulls against the other axle and vice versa. The connection of this strap to the clutches is best shown in Fig. 5.

Instead of two levers 16, only one need to be used which is secured to shaft 17, which by means of a link 28, equalizing lever 29, and links 30, connects to the two sliding clutch-halves. Otherwise the construction and operation remain the same. A spring 31, interposes between the two clutch-sections to keep them normally apart, in case any of the parts become out of order and to prevent the device from becoming active when not necessary.

When desirable or necessary, the clutch may be at one end of the axle near the inner side of the wheels, in which case one clutch-face may be affixed to the latter, or two clutches may be used on one axle near each end in the same manner, in which case the parts are simply duplicated.

Having described my invention, I claim as new—

1. In a safety-stop for cars, the combination of the car-axle and wheels thereon, a clutch-section rigidly secured to the axle, another clutch-section adjustably secured thereto and normally out of engagement with the first section, a tension-rod or chain having its end secured to a fixed point on the car and connecting to the adjustable clutch-half in a manner to prevent it from rotating after engagement with the fixed half, whereby the rotation of the wheels and axle is positively stopped, and means to bring the two clutch-sections into operative engagement.

2. In a safety-stop for cars, the combination of the car axle, the wheels thereon, a clutch-section rigidly secured to the axle, another clutch-section adjustably secured thereto and normally out of engagement with the first section, a tension-rod or chain, having its end secured to a fixed point on the car and connecting to the adjustable clutch-half in a manner to prevent it from rotating after engagement with the fixed half whereby the rotation of the wheels and axle is positively stopped, and an operating lever and rock-shaft connected to the adjustable clutch-section for the purpose of actuating the device.

3. In a safety-stop for cars, the combination of the car-axle, and wheels thereon, a clutch-section rigidly secured to the axle, another clutch-section adjustably secured thereto and normally out of engagement with the first section, a tension-rod or chain having its end secured to a fixed point on the car and connecting to the adjustable clutch-half in a manner to prevent it from rotating after engagement with the fixed half, whereby the rotation of the wheels and axle is positively stopped, and a lever 16, engaging with the adjustable clutch-section, a rock-shaft 17, and a lever on the latter, to operate the device.

4. In a safety-stop for cars, the combination of the car-axle, and wheels thereon, brake-shoes for the latter, a clutch-section rigidly secured to the axle, another clutch-section adjustably secured thereto and normally out of engagement with the first section, a tension-rod or chain operatively connected with the brake-shoes and having one end secured to the adjustable clutch-section, the other to a fixed point on the car, whereby such clutch-section is prevented from rotation after engagement with the fixed section, which engagement causes the brake-shoes to operate and also stops positively the further rotation of the axle and wheels thereon, and means to bring the two clutch-sections into operative engagement.

5. In a safety-stop for cars, the combination of the car-axle, and wheels thereon, brake-shoes for the latter, brake-beams which support them, a clutch-section rigidly secured to the axle, another clutch-section, adjustably secured thereto and normally out of engagement with the first section, a tension-rod or chain operatively connected with the brake-beams and having one end secured to the adjustable clutch-section, the other to a fixed point on the car, whereby such clutch-section is prevented from rotation after engagement with the fixed section, which engagement causes the brakeshoes to operate and also stops positively the further rotation of the axle and wheels thereon, and means to bring the two clutch-sections into operative engagement.

6. In a safety-stop for cars, the combination of the car-axles, and wheels thereon, brake-shoes for the latter, the brake-beams which support them, rods 22, connecting to the brake-beams near their ends, a clutch-section rigidly secured to the axle, another clutch-section adjustably secured thereto and normally out of engagement with the first section, a chain 15, connecting the adjustable clutch-section with rods 22, at their junction whereby such clutch-section is prevented from rotation after engagement with the fixed section, which engagement causes the brakeshoes to operate and also stops positively the further rotation of the axle and wheels thereon, a chain 24, secured to a fixed point on the car to relieve the brake-beams from excessive strain and means to bring the two clutch-sections into operative engagement.

In testimony whereof I affix my signature in presence of two witnesses.

ALFRED B. TRENNER.

Witnesses:
  C. SPENGEL,
  WM. KRAMER.